(12) United States Patent
Wu et al.

(10) Patent No.: US 11,760,510 B1
(45) Date of Patent: Sep. 19, 2023

(54) SPACECRAFT DESIGN WITH SEMI-RIGID SOLAR ARRAY

(71) Applicant: Space Systems/Loral, LLC, Palo Alto, CA (US)

(72) Inventors: Gordon Wu, Lafayette, CO (US); David Marlow, Redwood City, CA (US); Harry Yates, Mountain View, CA (US); Lenny Low, Hillsborough, CA (US); Joel Boccio, Palo Alto, CA (US)

(73) Assignee: Maxar Space LLC, Palo Alto, CA (US)

( * ) Notice: Subject to any disclaimer, the term of this patent is extended or adjusted under 35 U.S.C. 154(b) by 491 days.

(21) Appl. No.: 16/813,559

(22) Filed: Mar. 9, 2020

(51) Int. Cl.
*B64G 1/44* (2006.01)
*H02S 40/42* (2014.01)
*H02S 30/20* (2014.01)
*B64G 1/50* (2006.01)

(52) U.S. Cl.
CPC ............ *B64G 1/443* (2013.01); *B64G 1/503* (2013.01); *H02S 30/20* (2014.12); *H02S 40/42* (2014.12)

(58) Field of Classification Search
CPC ................................ B64G 1/443; B64G 1/503
See application file for complete search history.

(56) References Cited

U.S. PATENT DOCUMENTS

| 5,474,262 | A | * | 12/1995 | Fiore | B64G 1/22 244/159.4 |
| 5,785,280 | A | * | 7/1998 | Baghdasarian | B64G 1/222 244/172.6 |
| 6,034,322 | A | * | 3/2000 | Pollard | H01L 31/048 136/244 |
| 6,394,395 | B1 | * | 5/2002 | Poturalski | B64G 1/66 244/172.7 |
| 8,387,921 | B2 | * | 3/2013 | Taylor | B64G 1/443 244/172.6 |
| 8,939,588 | B2 | * | 1/2015 | Baudasse | B64G 1/54 244/172.6 |
| 9,156,568 | B1 | | 10/2015 | Spence et al. | |

(Continued)

FOREIGN PATENT DOCUMENTS

| CN | 102826236 A | 12/2012 |
| FR | 2967305 A1 | 5/2012 |
| JP | 2516669 B2 | 7/1996 |

*Primary Examiner* — Philip J Bonzell
*Assistant Examiner* — Michael B. Kreiner
(74) *Attorney, Agent, or Firm* — Vierra Magen Marcus LLP

(57) ABSTRACT

A spacecraft includes a semi-rigid solar array and a main body structure, the main body structure configured as a convex polyhedron and including an aft and a forward face disposed opposite to the aft face and at least four side faces disposed between and approximately orthogonal to the aft face and the forward face. The solar array includes a number of panels linked together with flexible couplings. In an undeployed configuration, panels of the solar array cover at least two adjacent side faces, the flexible couplings providing an articulable joint approximately aligned with a line along which the two adjacent side faces are joined and connecting a first panel of the solar array and a second panel of the solar array, the first panel being proximal to a first side face and the second panel being proximal to a second side face.

18 Claims, 11 Drawing Sheets

(56) References Cited

U.S. PATENT DOCUMENTS

| | | | |
|---|---|---|---|
| 9,352,855 B2 * | 5/2016 | Wong | B64G 1/503 |
| 9,580,190 B1 | 2/2017 | Spence et al. | |
| 11,148,834 B2 * | 10/2021 | Spark | B64G 1/44 |
| 2012/0267482 A1 | 10/2012 | Baudasse et al. | |
| 2019/0329912 A1 * | 10/2019 | Kawamura | B64G 1/44 |

* cited by examiner

SPACECRAFT DESIGN WITH SEMI-RIGID SOLAR ARRAY

TECHNICAL FIELD

This invention relates generally to a spacecraft, and particularly to a spacecraft having a deployable "semi-rigid" solar array the deployable solar array including a number of thin panels linked together with flexible couplings.

BACKGROUND

The assignee of the present invention manufactures and deploys spacecraft for, inter alia, communications and broadcast services.

Such spacecraft may be equipped with thermal radiator surfaces configured to radiate waste heat generated by spacecraft equipment including, for example, payload electronics and at least one photovoltaic solar array configured to generate, at least when deployed, electrical power. The spacecraft may include a main body configured approximately as a convex polyhedron, at least some faces of which include thermal radiator surfaces. The solar array(s) may be mechanically coupled with the main body of the spacecraft at a respective face of the main body. The respective face may also include one of the thermal radiator surfaces. Such spacecraft may also be required to undergo orbit transfer from a first orbit to a second orbit. For example, the spacecraft may undergo orbit raising from an initial orbit (into which the spacecraft is disposed by a launch vehicle, for example) to an operational orbit.

A spacecraft configuration design is required to accommodate constraints imposed by a launch vehicle fairing, and support spacecraft power and thermal management requirements during all mission phases, including orbit transfer. Improved spacecraft configuration designs are desirable.

SUMMARY

According to some implementations, a spacecraft includes a deployable solar array and a main body structure coupled with a structural interface adapter for mating to a launch vehicle, the main body structure configured as a convex polyhedron and including: an aft face disposed proximate to the structural interface adapter, a forward face disposed opposite to the aft face, and at least four side faces disposed between and approximately orthogonal to the aft face and the forward face. The deployable solar array includes a number of panels linked together with flexible couplings. In an undeployed configuration, panels of the solar array cover at least two adjacent side faces including a first side face and a second side face, the flexible couplings providing an articulable joint approximately aligned with a line along which the two adjacent side faces are joined and connecting a first panel of the solar array and a second panel of the solar array, the first panel being proximal to the first side face and the second panel being proximal to the second side face.

In some examples, the main body structure may include at least five side faces. In some examples, in the undeployed configuration, panels of the solar array may cover at least three of the side faces.

In some examples, one or more of the at least two adjacent side faces may be configured as thermal radiator panels. In some examples, the spacecraft may be configured to undergo an orbit transfer operation with a substantial portion of the thermal radiator panels covered by panels of the solar array.

In some examples, during the orbit transfer operation, photovoltaic cells of at least two solar panels may convert incident solar radiation to electricity.

In some examples, each panel of the solar array may be approximately 20 mils thick.

In some examples, the flexible couplings may be formed from an elastic material. In some examples, in the undeployed configuration, the elastic material may be in an unrelaxed condition that stores strain energy. In some examples, the solar array may be configured to undergo a transition from the undeployed configuration to a deployed configuration. In some examples, the transition may be a result, at least in part, of the strain energy causing the elastic material to change from the unrelaxed condition to a relaxed condition. In some examples, in the deployed configuration, the panels may be approximately co-planar. In some examples, the transition may be a passive result only of the strain energy causing the elastic material to change from the unrelaxed condition to a relaxed condition.

According to some implementations, a deployable solar array for a spacecraft includes a number of panels linked together with flexible couplings. The spacecraft includes a main body structure coupled with a structural interface adapter for mating to a launch vehicle, the main body structure configured as a convex polyhedron and including an aft face disposed proximate to the structural interface adapter, a forward face disposed opposite to the aft face; and at least four side faces disposed between and approximately orthogonal to the aft face and the forward face. In an undeployed configuration, panels of the solar array cover at least two adjacent side faces including a first side face and a second side face; and the flexible couplings provide an articulable joint approximately aligned with a line along which the two adjacent side faces are joined and connecting a first panel of the solar array and a second panel of the solar array, the first panel being proximal to the first side face and the second panel being proximal to the second side face.

In some examples, in the undeployed configuration, panels of the solar array may cover at least three of the side faces.

In some examples, during an orbit transfer operation, photovoltaic cells of at least two solar panels may convert incident solar radiation to electricity.

In some examples, each panel of the solar array may be approximately 20 mils thick.

In some examples, the flexible couplings are formed from an elastic material. In some examples, in the undeployed configuration, the elastic material may be in an unrelaxed condition that stores strain energy. In some examples, the solar array may be configured to undergo a transition from the undeployed configuration to a deployed configuration. In some examples, the transition may be a result, at least in part, of the strain energy causing the elastic material to change from the unrelaxed condition to a relaxed condition. In some examples, in the deployed configuration, the panels may be approximately co-planar. In some examples, the transition may be a passive result only of the strain energy causing the elastic material to change from the unrelaxed condition to a relaxed condition.

According to some implementations, a method of operating an orbiting spacecraft includes reconfiguring a deployable solar array of the spacecraft from an undeployed configuration to a deployed configuration. The solar array includes a number of panels linked together with flexible couplings, the spacecraft includes a main body structure coupled with a structural interface adapter for mating to a launch vehicle, the main body structure configured as a convex polyhedron and including an aft face disposed proximate to the structural interface adapter, a forward face disposed opposite to the aft face; and at least four side faces disposed between and approximately orthogonal to the aft face and the forward face. In the undeployed configuration, panels of the solar array cover at least two adjacent side faces including a first side face and a second side face; and the flexible couplings provide an articulable joint approximately aligned with a line along which the two adjacent side faces are joined and connecting a first panel of the solar array and a second panel of the solar array, the first panel being proximal to the first side face and the second panel being proximal to the second side face.

In some examples, one or more of the at least two adjacent side faces may be configured as thermal radiator panels and further comprising executing an orbit transfer operation with a substantial portion of the thermal radiator panels covered by panels of the solar array. In some examples, the executing the orbit transfer operation may occur prior to a start of the reconfiguring a deployable solar array of the spacecraft from the undeployed configuration to the deployed configuration. In some examples, the executing the orbit transfer operation may occur subsequent to a start of the reconfiguring and prior to completion of the reconfiguring. In some examples, during the orbit transfer operation, photovoltaic cells of at least two solar panels may convert incident solar radiation to electricity.

BRIEF DESCRIPTION OF THE DRAWINGS

Features of the invention are more fully disclosed in the following detailed description, reference being had to the accompanying drawings, in which like reference numerals designate like elements, and in which.

Figure 1:
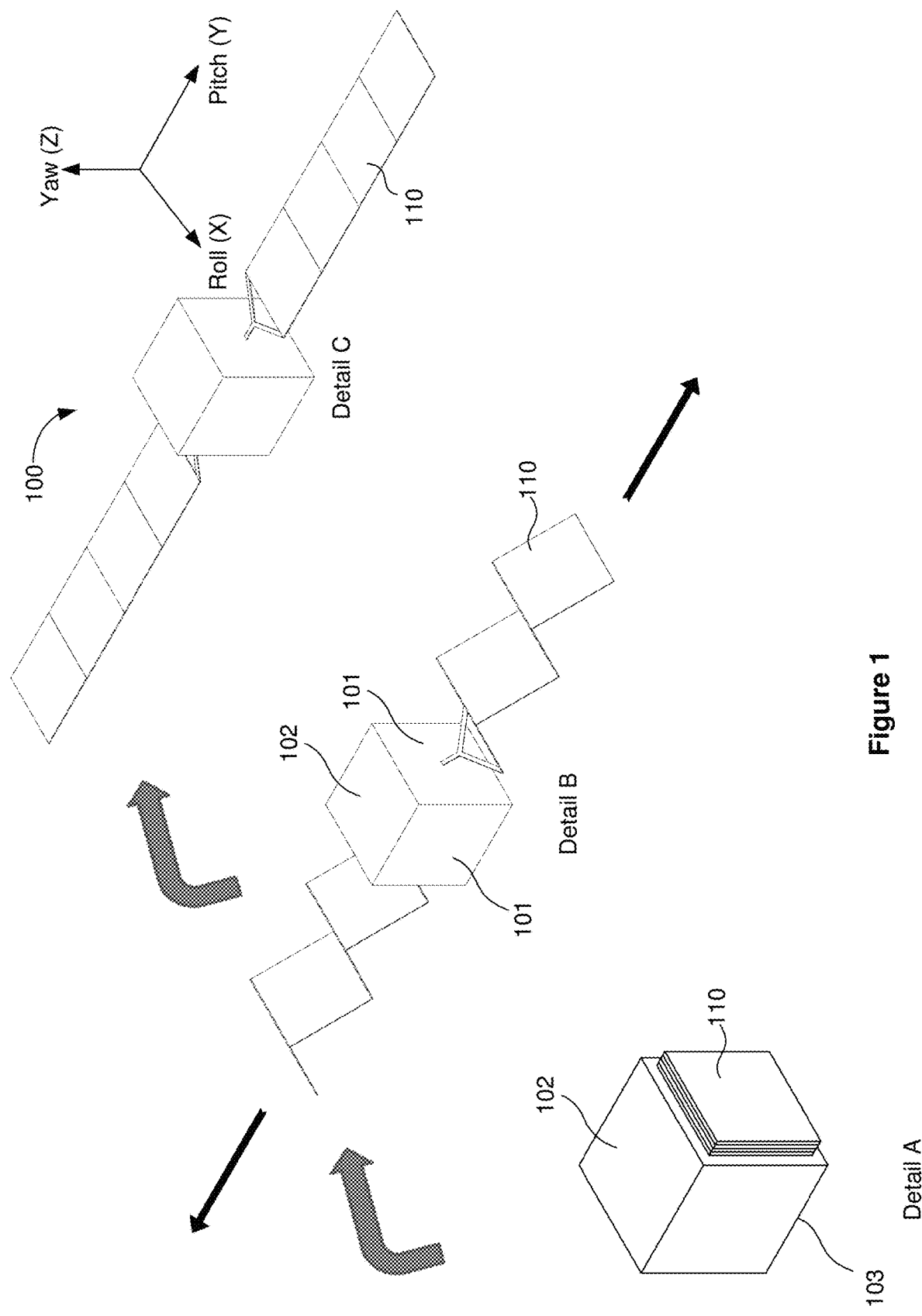
FIG. 1 illustrates a simplified illustration of a spacecraft according to the prior art.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The present inventors have appreciated that a spacecraft design may advantageously include at least one semi-rigid solar array configured to wrap around, in the launch configuration, two or more radiator panels. The configuration has been found to provide a better utilization of launch vehicle fairing volume as well as, in at least some embodiments, reducing heater power required and/or increasing solar power generation during orbit transfer maneuvers.

In the absence of the presently disclosed techniques, rigid solar array panels may, in a launch configuration, be folded accordion-style proximate to one of the radiator panels. FIG. 1 illustrates a simplified illustration of a spacecraft 100 having a main body configured as a polyhedron including six rectangular faces, more particularly four side faces 101 disposed between a forward face 102 that is disposed opposite to an aft face 103. In the launch configuration (Detail A) the aft face may be disposed proximate to a structural interface adapter (not illustrated) for mating to a launch vehicle (not illustrated). In the launch configuration each solar array 110 is folded and disposed proximate to and parallel with a respective one of the side faces 101. After separation from a launch vehicle, each solar array 110 may be deployed, that is, unfolded into a planar array extending outboard from the side face 101. Thus, the solar arrays 110 are reconfigured from a launch configuration (Detail A) through an intermediate configuration (Detail B) to an on-orbit configuration (Detail C). In the illustrated example, each solar array 110 is depicted as having four rigid panels. Typically, such rigid panels may include photovoltaic cells disposed on a rigid aluminum or carbon composite honeycomb structural panel that may have a thickness of about 2-3 cm.

In addition, it is known to configure solar arrays from a flexible material of a few mm's thickness, configured to be rolled into a cylindrical shape for compatibility with a launch vehicle, and then deployed (unrolled, or unfurled) after separation from the launch vehicle, as disclosed in U.S. Pat. Nos. 8,109,472, and 8,683,755, for example. Such a solar array may be referred to as a roll-out solar array (ROSA).

Figure 2:
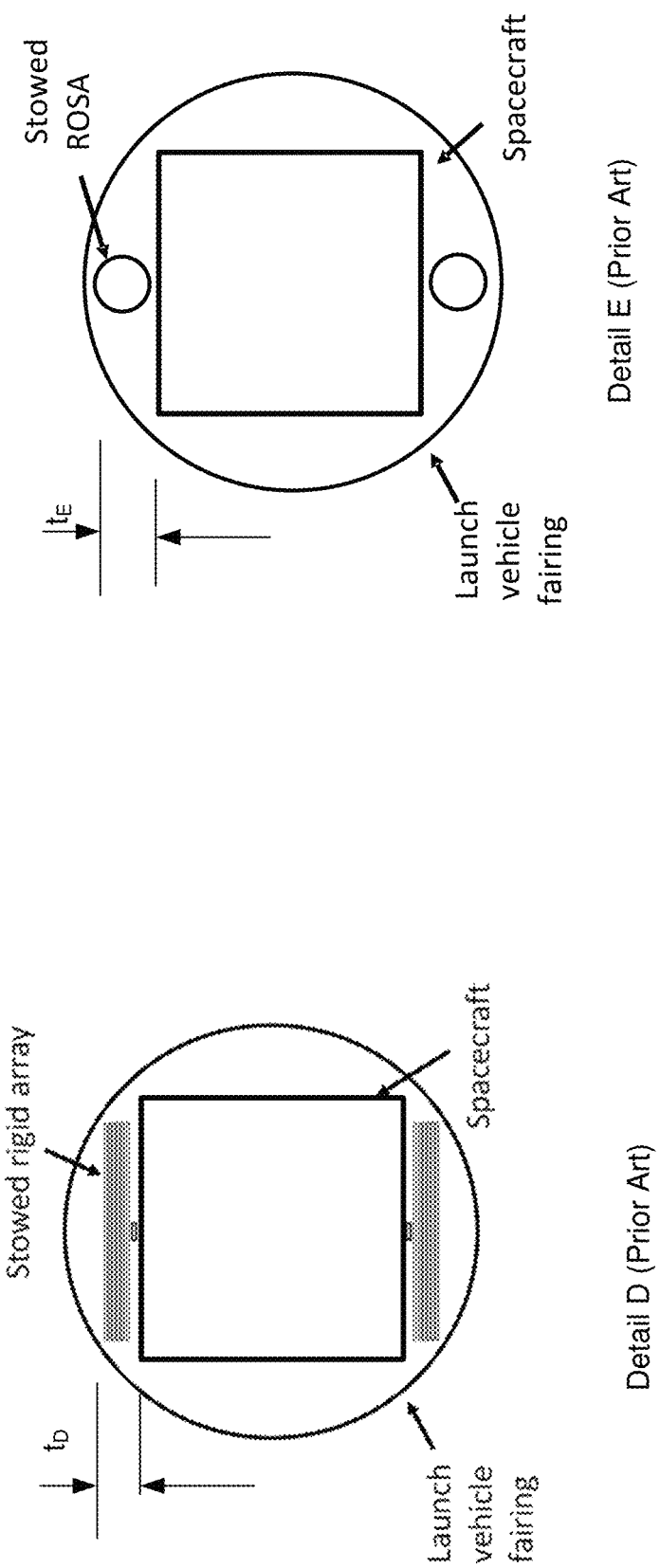
FIG. 2 illustrates simplified conceptual views of two differently designed spacecraft as each may be configured for launch, according to the prior art.

Features and benefits of the presently disclosed techniques may be better appreciated by first referring to FIG. 2 which illustrates simplified conceptual views of two differently designed spacecraft as each may be configured for launch. The views are taken along an axis that is parallel with a launch vehicle longitudinal axis and may correspond to the yaw (Z) axis of FIG. 1. Detail D illustrates the launch configuration for a spacecraft having two solar arrays, each solar array being comprised of rigid panels. A typical solar array having 4 to 6 rigid panels, each panel being approximately 1 inch thick, the value of $t_D$ may be at least 4-6 inches and the volume occupied by the stowed solar array may be quite significant. Similarly, referring to Detail E, where a spacecraft includes a ROSA-type solar arrays, notwithstanding that the deployed array is very thin, the value of $t_E$ has been found to typically exceed 20".

Figure 3A:
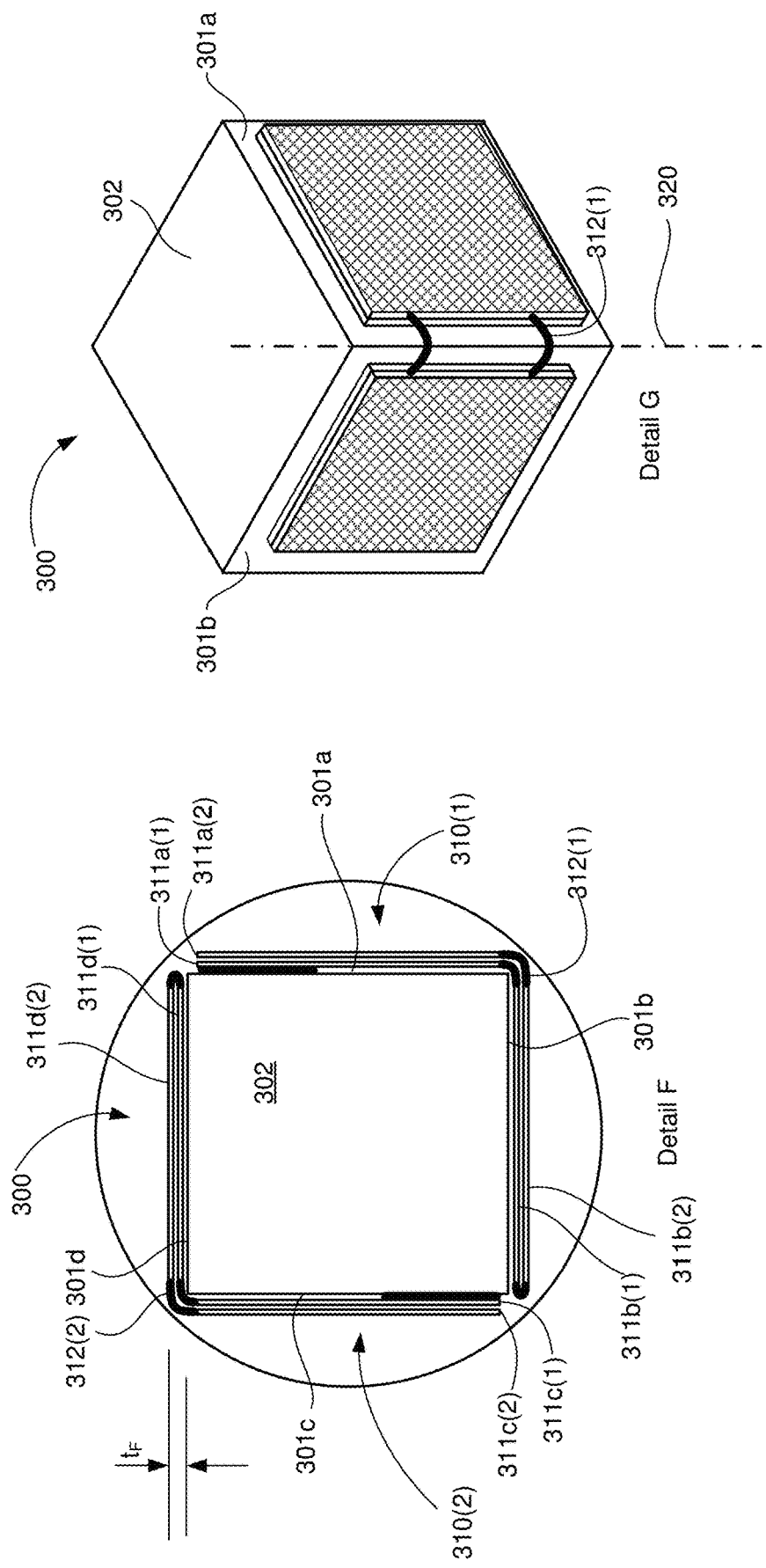
FIGS. 3A and 3B, illustrate features of a spacecraft with deployable solar array including a number of thin panels, according to an embodiment.

In contrast, referring now to FIG. 3A, the present disclosure contemplates a deployable solar array including a number of thin panels, each panel having a thickness substantially smaller than the conventional rigid panels of Detail D and a stiffness substantially larger than that of the flexible ROSA array fabric. Each deployable solar array includes a number of thin panels linked together with flexible couplings, and may be accordingly be referred to as a "semi-rigid" array. In some implementations, the thin panels may have a thickness in the range of 10-50 mils. In some implementations the panels may be approximately 20 mils thick. The panels may be formed from fiberglass, for example, or another semi-rigid composite material, such as, for example, Kevlar, graphite fiber reinforced polymer, or Nomex or combinations of two or more such materials. Referring to Detail F, it may be observed that, in the (undeployed) launch configuration, the thin solar array panels 311 are disposed to cover two adjacent side faces. In such a configuration, the value of $t_F$ may be as little as 1-2 inches and the volume occupied by the stowed solar array is significantly reduced. Thus, more efficient use of the fairing volume may be enabled.

In the illustrated example, a first deployable solar array 310(1) includes a number of solar panels 311a, disposed proximal to a side face 301a of spacecraft 300 and a number of solar panels 311b, disposed proximal to a side face 301b of the spacecraft 300. Flexible couplings 312(1) may be configured to provide an articulable joint between respective pairs of solar panels. For example, each solar panel 311a may be articulably coupled by way of one or more flexible couplings 312(1) with a respective solar panel 311b. Similarly, a second deployable solar array 310(2) includes a number of solar panels 311c, disposed proximal to a side face 301c of the spacecraft 300 and a number of solar panels 311d, disposed proximal to a side face 301d of the spacecraft 300. Flexible couplings 312(2) may be configured to provide an articulable joint between respective pairs of solar panels. For example, each solar panel 311c may be articulably coupled by way of one or more flexible couplings 312(2) with a respective solar panel 311d.

As may be better observed in Detail G, the flexible couplings 312 provide an articulable joint approximately aligned with a line 320 along which the two adjacent side faces 301a and 301b are joined. In the illustrated example, line 320 is approximately orthogonal to forward face 302 of the spacecraft 300.

Figure 3B:
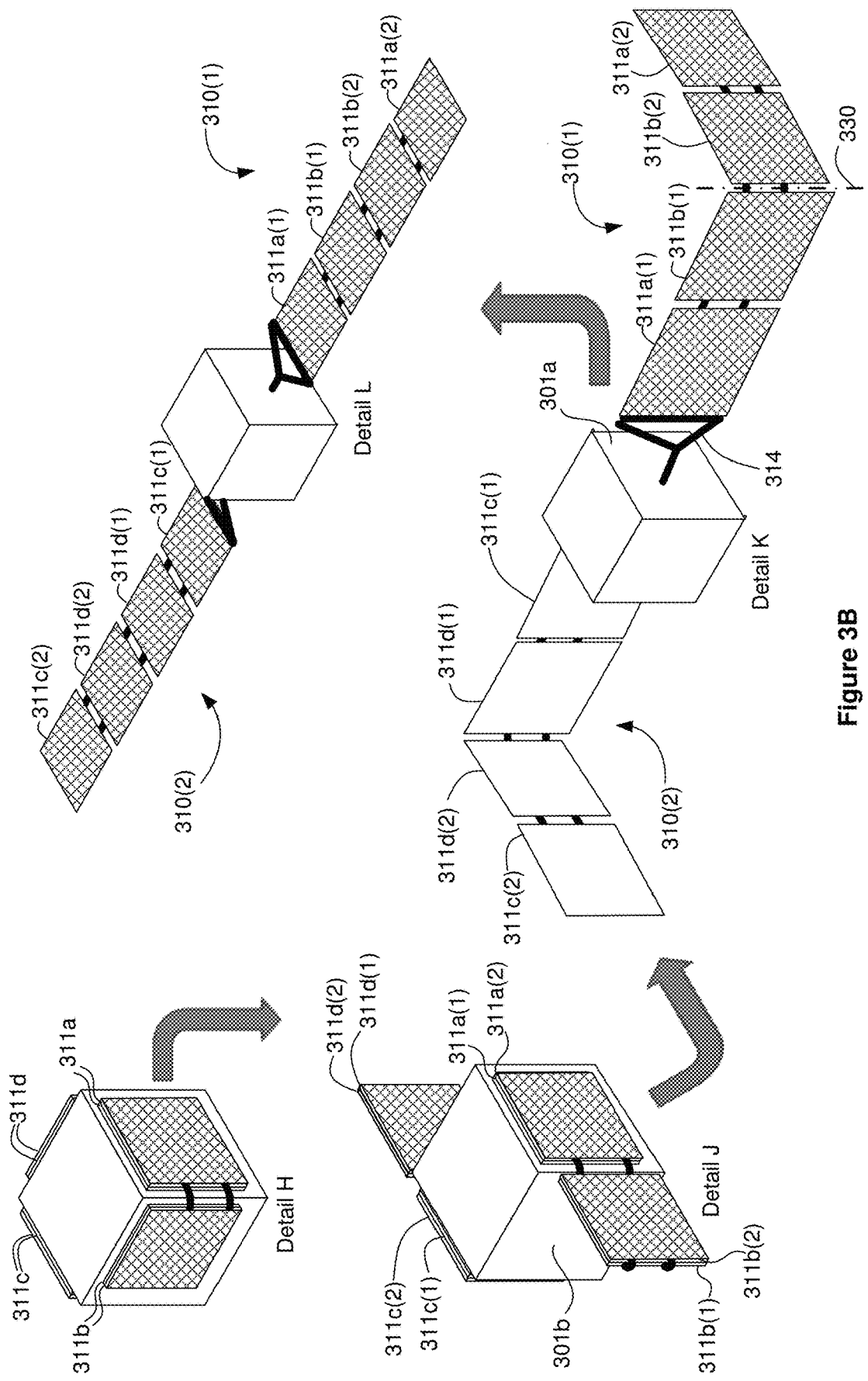

FIG. 3B illustrates an example of a deployment sequence of solar arrays of the spacecraft 300 according to an embodiment. Detail H shows the spacecraft 300 in the undeployed (launch vehicle compatible) configuration, similar to Detail G of FIG. 3A. Detail J shows a first transition configuration in which solar panels 311b and 311d have rotated 90 degrees about respective articulable joints. In the illustrated first transition configuration, panels 311b are approximately coplanar with panels 311a, whereas panels 311d are approximately coplanar with panels 311c.

Detail K shows a second transition configuration in which it may be observed that an inboard panel 311a(1) of solar array 310(1) is coupled by way of yoke 314 with side wall 301a. An inboard panel 311b(1) is approximately coplanar with panel 311a(1). An outboard panel 311b(2) is approximately coplanar with panel 311a(2). The outboard panel 311b(2) is shown to have rotated approximately 90 degrees with respect to inboard panel 311b(1). The rotation is about articulable joints approximately aligned with a line 330

Detail L shows a fully deployed configuration in which respective panels of each of solar arrays 310(1) and 310(2) are approximately coplanar. That is, as may be observed in Detail L, panels 311a(1), 311b(1), 311b(2) and 311a(2) are each approximately coplanar with each other, and, similarly, panels 311c(1), 311d(1), 311d(2) and 311c(2) are each approximately coplanar with each other.

The panels may have a thickness in the range of 10-50 mils. In some implementations the panels may be approximately 20 mils thick. The panels may be formed from fiberglass, for example, or another semi-rigid composite material, such as, for example, Kevlar, graphite fiber reinforced polymer, or Nomex or combinations of two or more such materials The flexible couplings 312, advantageously, may be formed from an elastic material and may be configured to store, in an unrelaxed condition (e.g., the undeployed launch configuration) strain energy. The strain energy may impart some or all of the motive force for the deployment sequence, as the strain energy causes the elastic material to change from the unrelaxed condition to a relaxed condition.

Figure 4A:
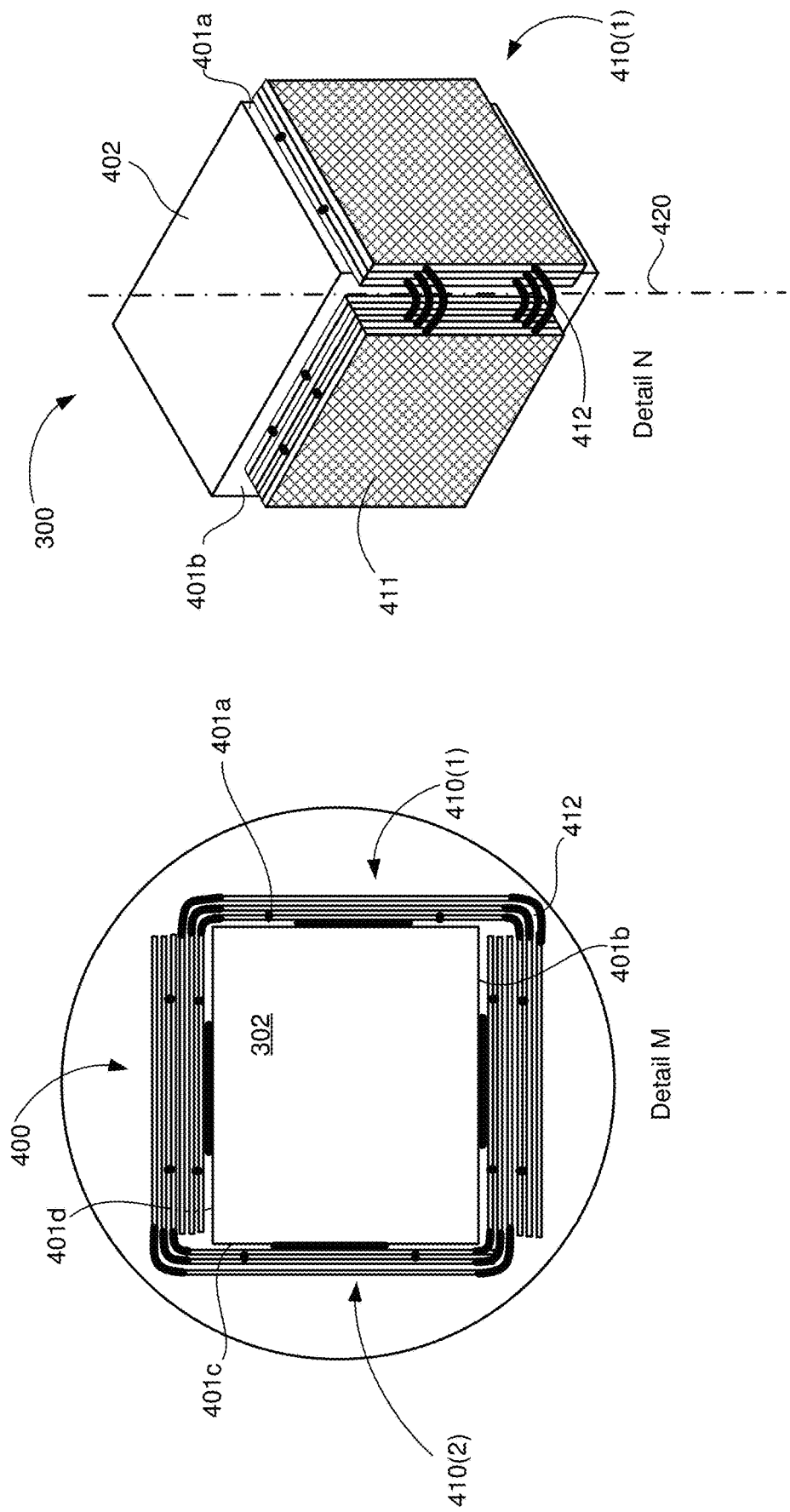
FIGS. 4A and 4B, illustrate features of a spacecraft with deployable solar array including a number of thin panels, according to another embodiment.

FIG. 4A illustrates a further example of a spacecraft design with semi-rigid solar arrays. Referring to Detail M, it may be observed that, in the (undeployed) launch configuration, a first deployable semi-rigid solar array 410(1) includes nine solar panels 411, arranged with three panels disposed proximal to side face 401a, three panels disposed proximal to side face 401b and three panels disposed proximal to side face 401d. Flexible couplings 412 may be configured to provide an articulable joint between respective pairs of solar panels. Similarly, a second deployable solar array 410(2) includes nine solar panels 411, arranged with three panels disposed proximal to side face 401c, three panels disposed proximal to side face 401b and three panels disposed proximal to side face 401d.

As may be better observed in Detail N, the flexible couplings 412 provide an articulable joint approximately aligned with a first line 420 proximal to an edge at which the two adjacent side faces 401a and 401b are joined. In the illustrated example, line 420 is approximately orthogonal to forward face 402 of the spacecraft 400.

Figure 4B:
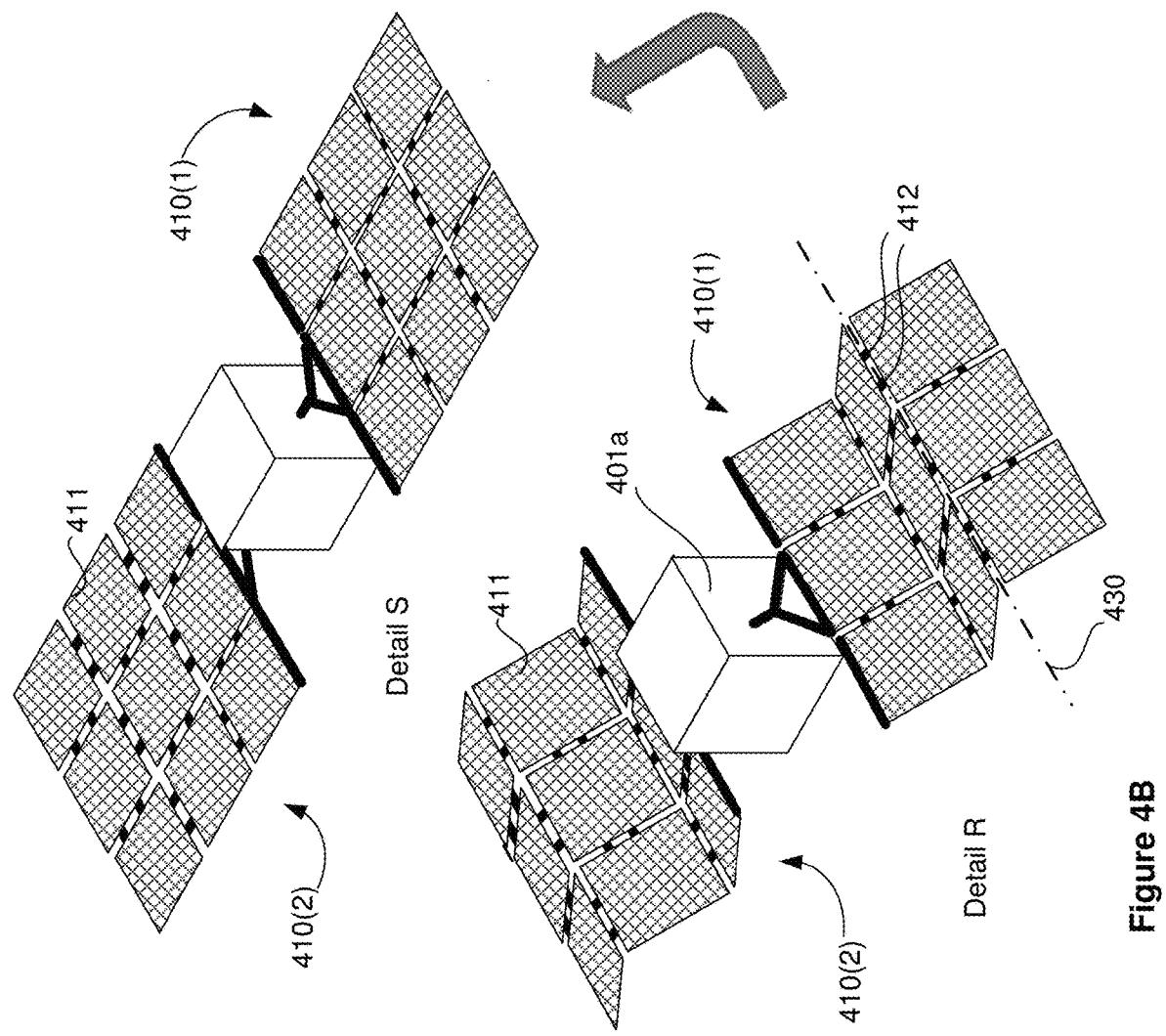
Figure 4B:
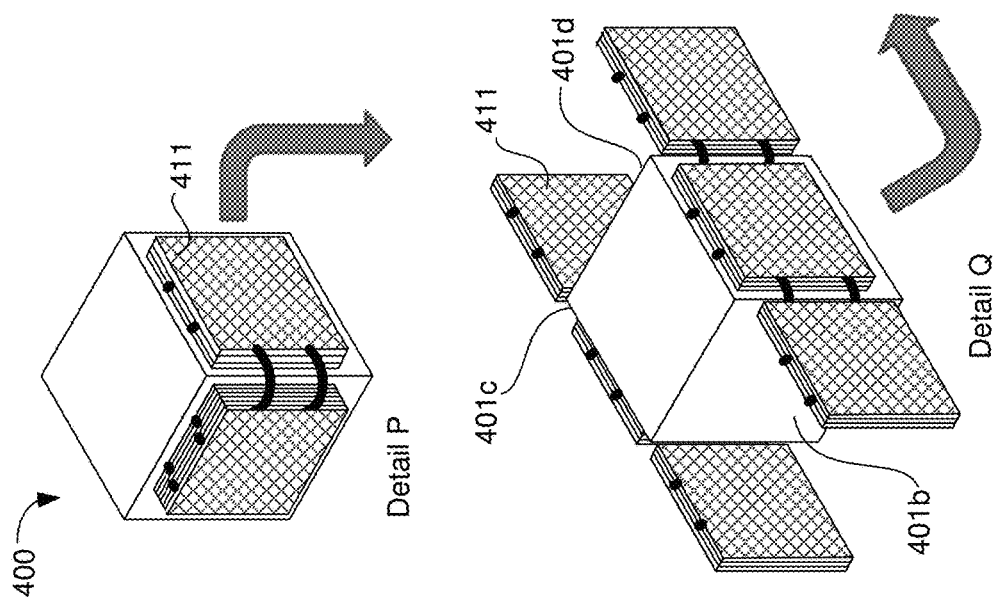

FIG. 4B illustrates an example of a deployment sequence of solar arrays of the spacecraft 400 according to an embodiment. Detail P shows the spacecraft 400 in the undeployed (launch vehicle compatible) configuration. Detail Q shows a first transition configuration in which solar panels initially disposed proximal to side walls 401*b* and 401*d* have rotated 90 degrees about respective articulable joints. The deployment sequence may continue through the second transition configuration illustrated in Detail R to a fully deployed configuration illustrated in Detail S. It may be observed that, in the illustrated example, each of solar array 410(1) and 410(2) is configured as a three by three array of solar panels 411. In the illustrated example, the solar arrays unfold, accordion-fashion by way of articulable joints formed by flexible couplings 312 that form articulable joints that are approximately parallel to spacecraft side faces 401*a* and 401*c*. For example, one set of flexible couplings 412 provide articulable joints approximately aligned with a line 430.

As indicated above, the flexible couplings 412, advantageously, may be formed from an elastic material and may be configured to retain, in an unrelaxed condition (e.g., the undeployed launch configuration) strain energy. The strain energy may impart some or all of the motive force for the deployment sequence, as the strain energy causes the elastic material to change from the unrelaxed condition to a relaxed (relatively low strain energy) condition.

Figure 5:
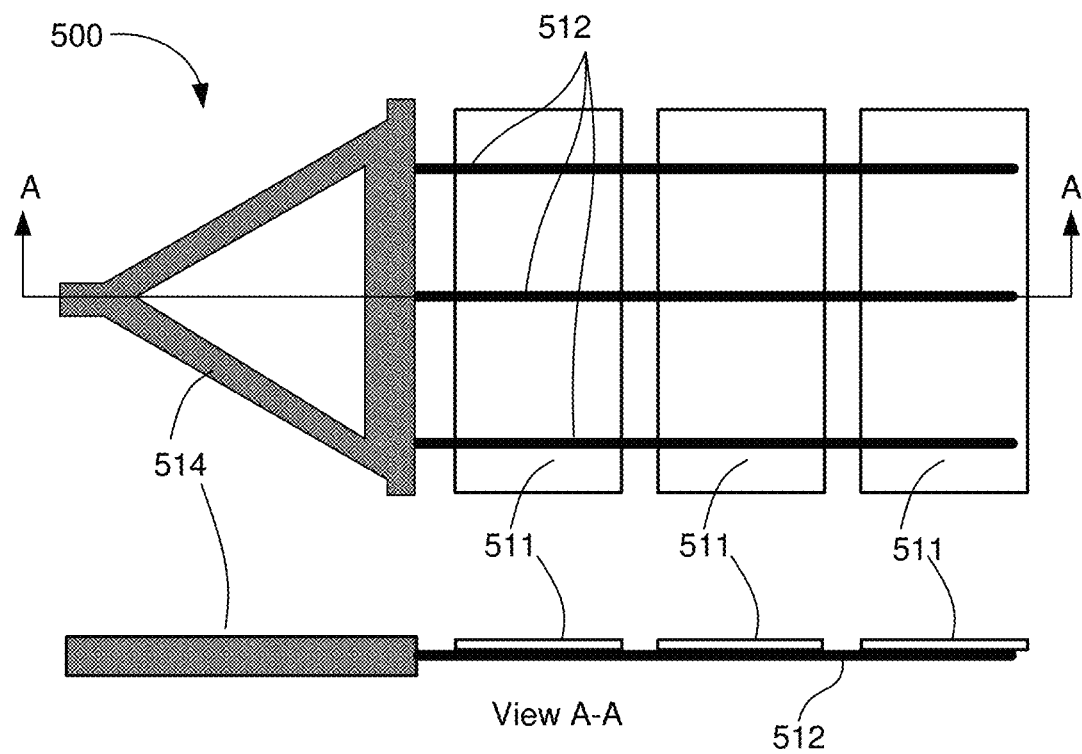
FIG. 5 illustrates a further example implementation of a semi-rigid solar array.

FIG. 5 illustrates a further example implementation of a semi-rigid solar array. In the illustrated example, solar array 500 includes a yoke 514 to which are coupled flexible couplings 512, which are in turn coupled with solar panels 511. In the illustrated example, each flexible coupling 512 extends across multiple solar panels 511, and may be secured, for example to the rear surface of one or more panels 511. In some implementations, the flexible couplings 512 may be formed from a material with an intrinsically low modulus of elasticity. In other implementations, the flexible couplings may be formed from a shaped metal. For example, the metal connections may be shaped so as to unfold and stiffen like a measuring tape with little or no motive force being required.

Figure 6B:
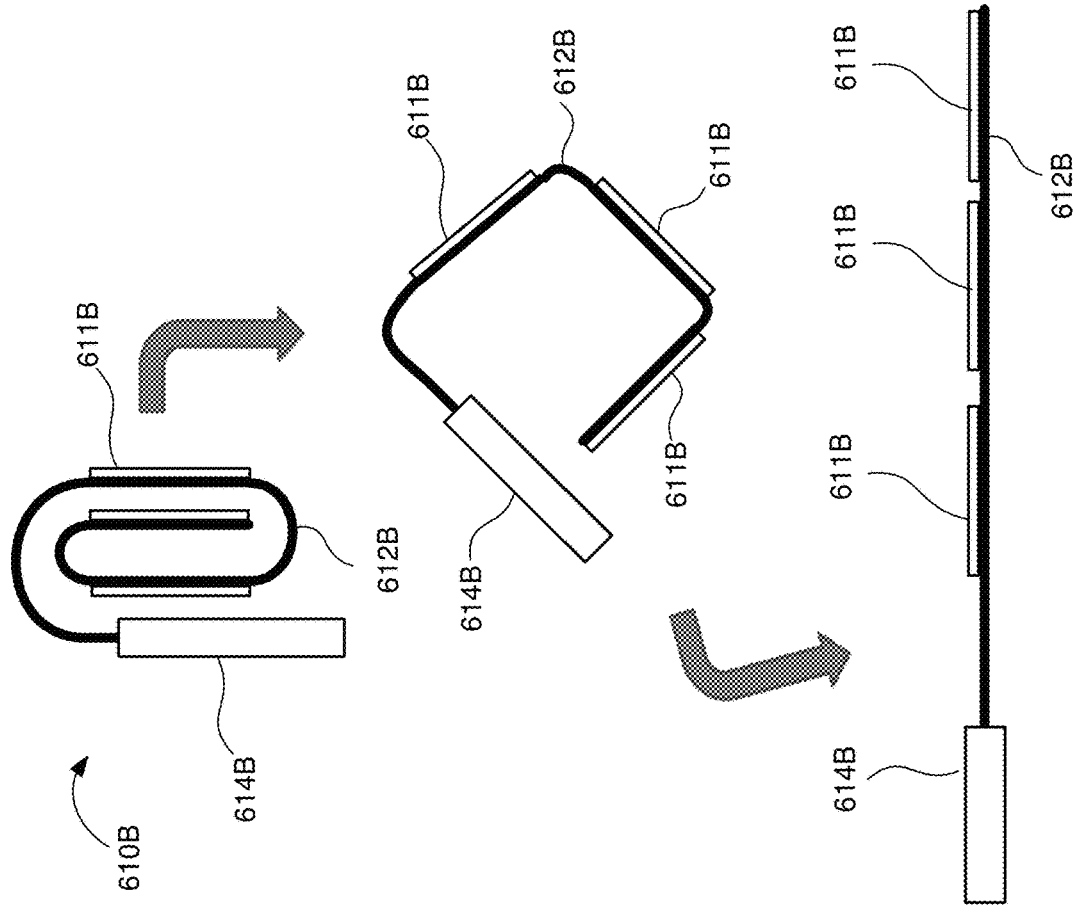
FIG. 6B illustrates an example of an unwinding type of deployment of a solar array according to another embodiment.
Figure 6A:
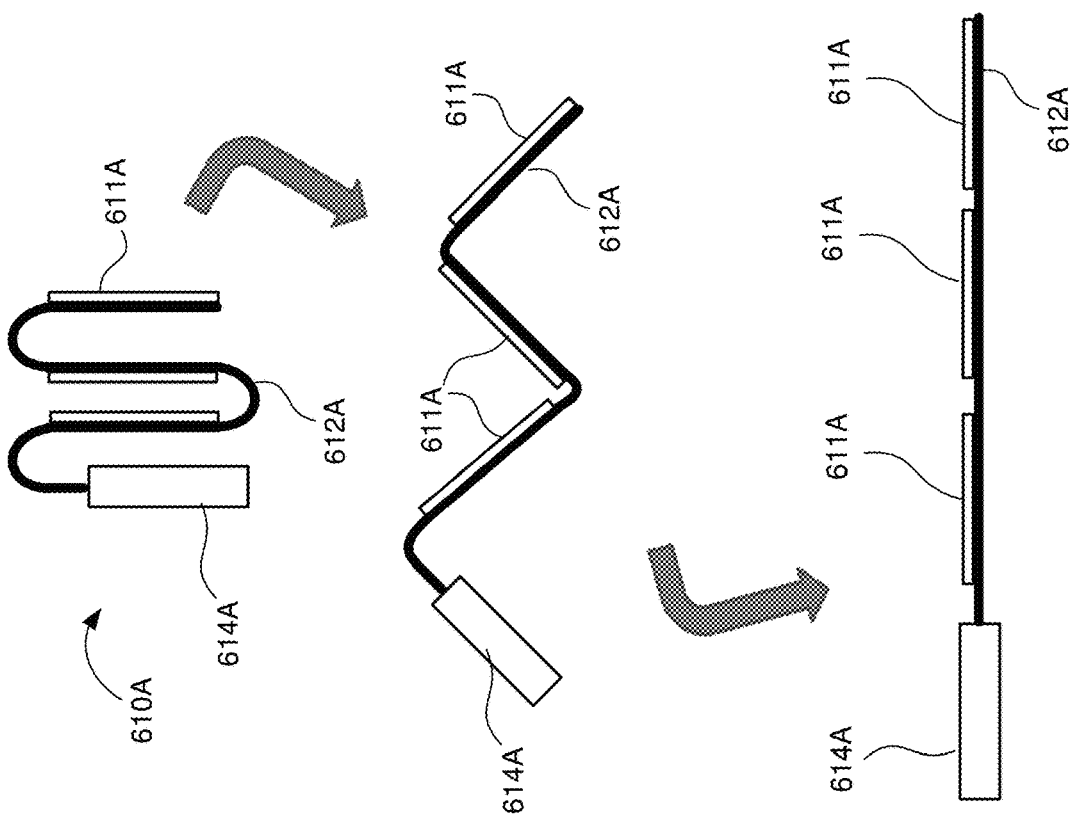
FIG. 6A illustrates an example of an accordion style deployment of a solar array, according to an embodiment.

In some implementations, a semi-rigid solar array may be deployed "accordion style"; in other implementations, deployment may occur by "unwinding" an undeployed array. FIG. 6A illustrates an example of an accordion style deployment of a solar array 610A, including yoke 614A, solar panels 611A and flexible coupling 612A. FIG. 6B illustrates an example of an unwinding type of deployment of a solar array 610B, including yoke 614B, solar panels 611B and flexible coupling 612B.

Figure 7A:
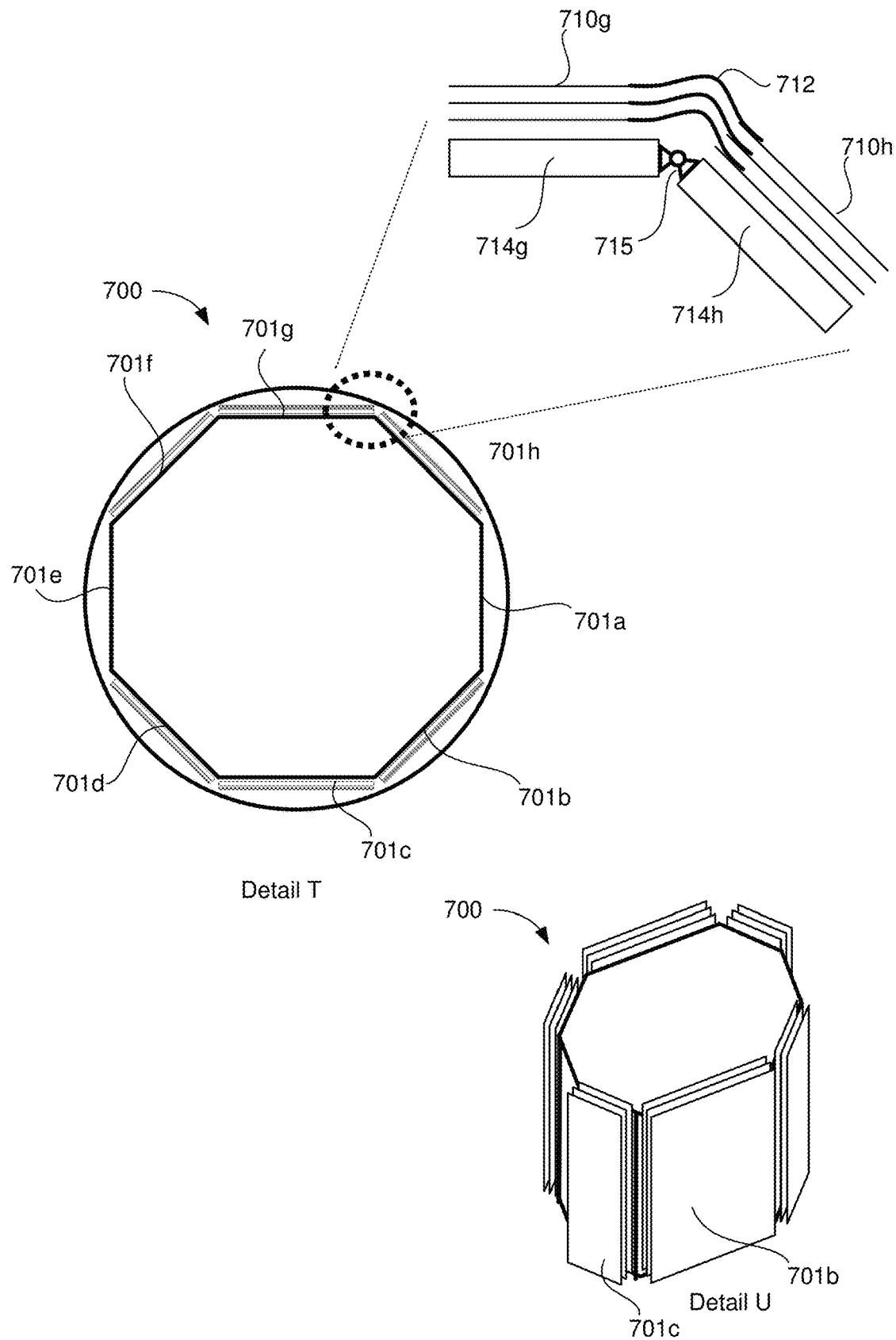
FIGS. 7A and 7B illustrate a simplified conceptual drawing of a spacecraft according a yet further embodiment.
Figure 7B:
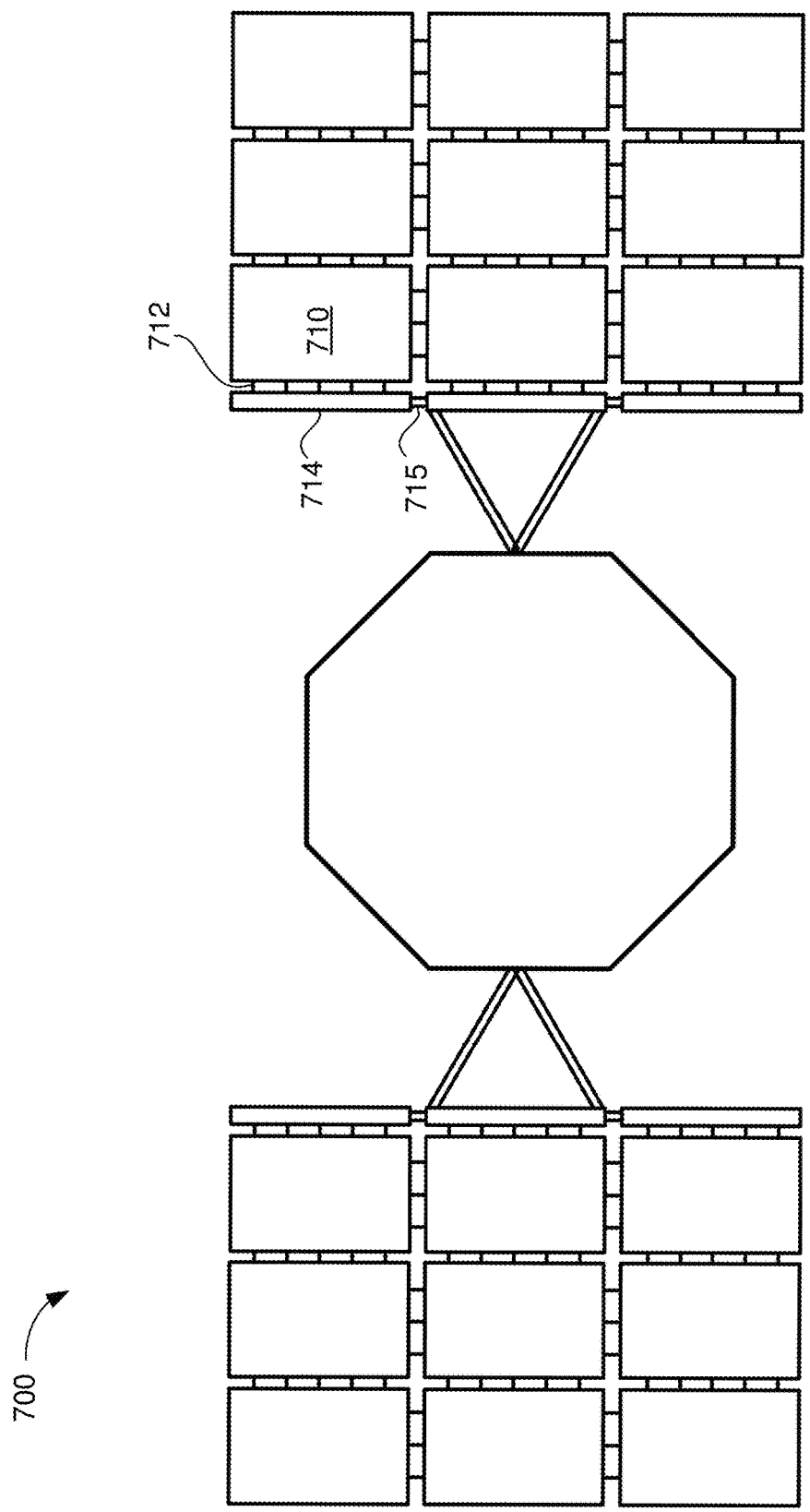

In the above described examples, the spacecraft main body has the form of a six-faced polyhedron (i.e., with 4 side faces parallel to the launch vehicle axis) disposed in between an aft face and a forward face. The present disclosure also contemplates spacecraft with more than 4 side faces. For example, FIGS. 7A and 7B illustrate a simplified conceptual drawing of a spacecraft 700 that includes eight side faces disposed between an aft face and a forward face. In the illustrated example, in the undeployed configuration (FIG. 7A) each of two solar arrays is disposed so as to have solar panels covering three side faces. In the illustrated example, side face 701*c*, and side faces 701*b* and 701*d* adjacent thereto, are covered by respective panels of a first semi-rigid solar array; similarly side face 701*g*, and side faces 701*f* and 701*h* adjacent thereto, are covered by respective panels of a second semi-rigid solar array.

In the illustrated example, adjacent panels 710*g* and 710*h* are coupled together with a flexible coupling 712. Similarly, adjacent yoke members 714*g* and 714*h* are coupled together with an articulable hinge 715. FIG. 7B illustrates the spacecraft 700 in a deployed configuration.

The panels may have a thickness in the range of 10-50 mils. In some implementations the panels may be approximately 20 mils thick. The panels may be formed from fiberglass, for example, or another semi-rigid composite material, such as, for example, Kevlar, graphite fiber reinforced polymer, or Nomex or combinations of two or more such materials. Adjacent ones of the panels may be mechanically coupled with an elastic flexible coupling, the elastic coupling providing an articulable joint between adjacent panels.

In some implementations, some or all of the side faces of the spacecraft main body are or include thermal radiator surfaces. Ordinarily, these thermal radiator surfaces may be sized so as to safely dissipate waste heat from spacecraft electronics when the spacecraft payload is operation in an on-orbit configuration. During a transfer orbit operation, such as an orbit raising maneuver, for example, the payload is ordinarily not operating and, to the extent these surfaces are free to radiate to space, compensation heaters may be required to prevent excessive cooling of the spacecraft. In accordance with the presently disclosed techniques, each solar panel, when undeployed, may cover two or more thermal radiator panels, thereby reducing the amount of heat power required.

In addition, the present techniques permit generating electrical power from the solar arrays, even when the solar arrays are undeployed during a transfer orbit operation, at a level substantially greater than that afforded by the configurations illustrated in Detail D and Detail E.

Figure 8:
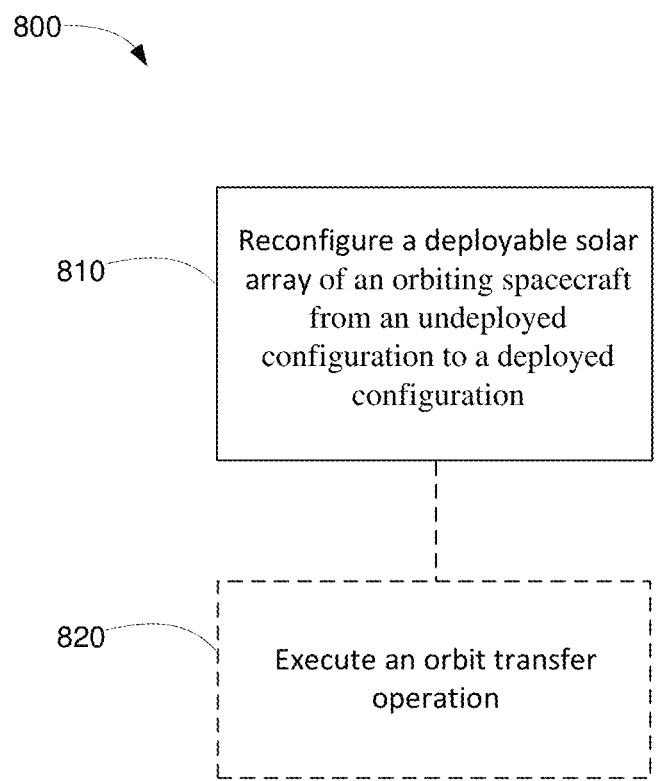
FIG. 8 illustrates a process flow diagram for performing an orbit transfer maneuver of an orbiting spacecraft, in accordance with an embodiment.

FIG. 8 illustrates a process flow diagram for performing an orbit transfer maneuver of an orbiting spacecraft, in accordance with an implementation. The method 800 may start, at block 810, with reconfiguring a deployable solar array of the spacecraft from an undeployed configuration to a deployed configuration. As indicated above, the solar array may include a number of panels linked together with flexible couplings. The spacecraft may include a main body structure coupled with a structural interface adapter for mating to a launch vehicle, the main body structure configured as a convex polyhedron and including an aft face disposed proximate to the structural interface adapter, a forward face disposed opposite to the aft face; and at least four side faces disposed between and approximately orthogonal to the aft face and the forward face. In the undeployed configuration, panels of the solar array may cover at least two adjacent side faces including a first side face and a second side face. The flexible couplings may provide an articulable joint approximately aligned with a line along which the two adjacent side faces are joined and connecting a first panel of the solar array and a second panel of the solar array, the first panel being proximal to the first side face and the second panel being proximal to the second side face.

Optionally, the method 800 may include, at block 820, executing an orbit transfer operation. Advantageously, one or more of the at least two adjacent side faces are configured as thermal radiator panels and executing the orbit transfer operation is performed with a substantial portion of the thermal radiator panels covered by panels of the solar array. In some examples, executing the orbit transfer operation occurs prior to reconfiguring the deployable solar array from an undeployed configuration to a deployed configuration. In some examples, the executing the orbit transfer operation occurs subsequent to a start of the reconfiguring and prior to completion of the reconfiguring. In some examples, during the orbit transfer operation, photovoltaic cells of at least two solar panels convert incident solar radiation to electricity Thus, a spacecraft with a semi-rigid solar array has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
    a main body structure coupled with a structural interface adapter for mating to a launch vehicle, the main body structure configured as a convex polyhedron and including:
        an aft face disposed proximate to the structural interface adapter;
        a forward face disposed opposite to the aft face; and
        a first side face disposed between and approximately orthogonal to the aft face and the forward face and a second side face disposed parallel and opposite to the first side face;
    a third side face disposed between the first side face and second side face and approximately orthogonal to the aft face and the forward face and a fourth side face disposed parallel and opposite to the third side face; and
    a first deployable solar array coupled with the first side face and comprising a first plurality of panels linked together with flexible couplings and a second deployable solar array coupled with the second side face and comprising a second plurality of panels linked together with flexible couplings, wherein:
        the first plurality of panels comprises a first set of two or more panels disposed parallel to and outboard of the first side face, a second set of two or more panels disposed parallel to and outboard of the third side face, and a third set of two or more panels disposed parallel to and outboard of the fourth side face; and
        the second plurality of panels comprises a fourth set of two or more panels disposed parallel to and outboard of the second side face, a fifth set of two or more panels disposed parallel to and outboard of the second set of panels, and a sixth set of two or more panels disposed parallel to and outboard of the fourth side face and inboard of the third set of panels.

2. The spacecraft of claim 1, wherein the main body structure includes at least five side faces.

3. The spacecraft of claim 2, wherein, in the undeployed configuration, panels of the solar array cover at least three of the side faces.

4. The spacecraft of claim 1, wherein one or more of the at least two adjacent side faces are configured as thermal radiator panels.

5. The spacecraft of claim 4, wherein the spacecraft is configured to undergo an orbit transfer operation with a substantial portion of the thermal radiator panels covered by panels of the solar array.

6. The spacecraft of claim 5, wherein, during the orbit transfer operation, photovoltaic cells of at least two solar panels convert incident solar radiation to electricity.

7. The spacecraft of claim 1, wherein each panel of the solar array has a thickness in the approximate range of 10-50 mils.

8. The spacecraft of claim 1, wherein the flexible couplings are formed from an elastic material.

9. The spacecraft of claim 8, wherein, in the undeployed configuration, the elastic material is in an unrelaxed condition that stores strain energy.

10. The spacecraft of claim 9, wherein the solar array is configured to undergo a transition from the undeployed configuration to a deployed configuration.

11. The spacecraft of claim 10, wherein the transition is a result, at least in part, of the strain energy causing the elastic material to change from the unrelaxed condition to a relaxed condition.

12. The spacecraft of claim 10, wherein, in the deployed configuration, the panels are approximately co-planar.

13. The spacecraft of claim 10, wherein the transition is a passive result only of the strain energy causing the elastic material to change from the unrelaxed condition to a relaxed condition.

14. A method of operating an orbiting spacecraft, the method comprising:
    reconfiguring deployable solar arrays of the spacecraft from an undeployed configuration to a deployed configuration; wherein:
        the spacecraft includes:
            a main body structure coupled with a structural interface adapter for mating to a launch vehicle, the main body structure configured as a convex polyhedron and including:
                an aft face disposed proximate to the structural interface adapter;
                a forward face disposed opposite to the aft face; and
                a first side face disposed between and approximately orthogonal to the aft face and the forward face and a second side face disposed parallel and opposite to the first side face;
        a third side face disposed between the first side face and second side face and approximately orthogonal to the aft face and the forward face and a fourth side face disposed parallel and opposite to the third side face; and
            a first deployable solar array coupled with the first side face and comprising a first plurality of panels linked together with flexible couplings and a second deployable solar array coupled with the second side face and comprising a second plurality of panels linked together with flexible couplings, the first plurality of panels comprising a first set of two or more panels disposed parallel to and outboard of the first side face, a second set of two or more panels disposed parallel to and outboard of the third side face, and a third set of two or more panels disposed parallel to and outboard of the fourth side face; and
        the second plurality of panels comprising a fourth set of two or more panels disposed parallel to and outboard of the second side face, a fifth set of two or more panels disposed parallel to and outboard of the second set of panels, and a sixth set of two or more panels disposed parallel to and outboard of the fourth side face and inboard of the third set of panels.

15. The method of claim 14, wherein one or more of the at least two adjacent side faces are configured as thermal radiator panels and further comprising executing an orbit transfer operation with a substantial portion of the thermal radiator panels covered by panels of the solar array.

16. The method of claim 15, wherein the executing the orbit transfer operation occurs prior to a start of the reconfiguring a deployable solar array of the spacecraft from the undeployed configuration to the deployed configuration.

17. The method of claim 15, wherein the executing the orbit transfer operation occurs subsequent to a start of the reconfiguring and prior to completion of the reconfiguring.

18. The method of claim 15, wherein, during the orbit transfer operation, photovoltaic cells of at least two solar panels convert incident solar radiation to electricity.

* * * * *

UNITED STATES PATENT AND TRADEMARK OFFICE
CERTIFICATE OF CORRECTION

PATENT NO. : 11,760,510 B1
APPLICATION NO. : 16/813559
DATED : September 19, 2023
INVENTOR(S) : G. Wu et al.

Page 1 of 1

It is certified that error appears in the above-identified patent and that said Letters Patent is hereby corrected as shown below:

In the Claims

Column 9, Lines 32-33 (Claim 1) please change "wherein: the" to -- wherein: in an undeployed configuration, the --

Signed and Sealed this
Twenty-ninth Day of October, 2024

Katherine Kelly Vidal
*Director of the United States Patent and Trademark Office*